United States Patent
Suzuki

[11] Patent Number: 5,868,041
[45] Date of Patent: Feb. 9, 1999

[54] REDUCED VIBRATION SHOCK ABSORBING DEFORMABLE STEERING WHEEL

[75] Inventor: Michitaka Suzuki, Fuji, Japan

[73] Assignee: Nihon Plast Co., Ltd., Shizuoka, Japan

[21] Appl. No.: 804,988

[22] Filed: Feb. 25, 1997

[30] Foreign Application Priority Data

Feb. 28, 1996 [JP] Japan .................................. 8-040976

[51] Int. Cl.⁶ .................................................. B62D 1/11
[52] U.S. Cl. ............................................................ 74/552
[58] Field of Search ........................... 74/552; 280/777, 280/780

[56] References Cited

U.S. PATENT DOCUMENTS

| 5,040,646 | 8/1991 | Drefahl | 74/552 X |
| 5,291,800 | 3/1994 | Patzelt et al. | 74/552 |
| 5,356,178 | 10/1994 | Numata | 74/552 X |

FOREIGN PATENT DOCUMENTS

| 29616 | 6/1981 | European Pat. Off. | 74/552 |
| 2346195 | 10/1977 | France | 74/552 |
| 178469 | 8/1987 | Japan | 74/552 |
| 258859 | 11/1987 | Japan | 74/552 |
| 5193503 | 8/1993 | Japan | 74/552 |
| 6144242 | 5/1994 | Japan | 74/552 |
| 887330 | 12/1981 | U.S.S.R. | 74/552 |

*Primary Examiner*—Charles A Marmor
*Assistant Examiner*—Mary Ann Battista
*Attorney, Agent, or Firm*—Joseph C. Mason, Jr.; Dennis G. LaPointe

[57] ABSTRACT

A steering which reduces vibration and is shock absorbing and deformable. The steering wheel comprises a rim and a boss with a plurality of spokes, the rim, boss and spokes having a core metal. A reinforced spoke-core metal has a spoke deformation region which is a part of the reinforced portion and is thinner than the remaining part of the reinforced portion. A raised portion is included on the driver-side of each spoke deformation region which increases the strength of core metals and restricts vibration of the core metals. The configuration creates a weak point for collapsing the steering wheel in a collision and impact with the steering wheel by the driver, that is, the raised portions receives tensile forces and break, thereby smoothly bending core metal bodies.

7 Claims, 2 Drawing Sheets

REDUCED VIBRATION SHOCK ABSORBING DEFORMABLE STEERING WHEEL

FIELD OF THE INVENTION

The present invention relates to a steering wheel which is capable of absorbing shock by means of bending the core metal.

BACKGROUND OF THE INVENTION

An example of conventional steering wheels is disclosed in Japanese Patent Laid-open No. 193503/1993, which comprises an annular rim portion, a boss portion located inside the ring defined by the rim portion and attached to a steering shaft, and a plurality of spokes connecting the rim portion and the boss portion, wherein the two ends of the core metal of each spoke are respectively enveloped in a die-cast metal by means of die casting and connected to the boss-core metal of the boss portion and the rim-core metal of the rim portion. However, the lower portion of the boss-side end of each spoke-core metal is not covered by the die-cast metal. The exposed part faces downward. With the configuration as above, in the event where a shock is delivered from above to the rim portion, the spoke-core metals bend, in a peeling off manner from the die-cast metal, thereby absorbing the shock.

However, the conventional configuration described above, wherein the lower part of the end of each spoke-core metal adjacent to the boss portion is exposed from the die-cast metal, causes a decrease in the resonance frequency of a steering wheel. This makes it difficult to reduce vibration of the steering wheel which results from vibration of the engine or other sources. In other words, the conventional configuration presents a problem in that it is difficult to make a steering wheel more comfortable to operate.

In order to prevent the above problems, an object of the present invention is to provide a steering wheel which has superior shock absorbing characteristics and is comfortable to operate due to reduced vibration.

SUMMARY OF THE INVENTION

A steering wheel of the present invention comprises a rim portion having a rim-core metal; a boss portion having a boss-core metal; and spoke portions having spoke-core metals for connecting together the rim-core metal and the boss-core metal, wherein each spoke portion is provided with a spoke deformation region and a raised portion formed on the spoke deformation region, the spoke deformation region being weaker than the remaining part of the spoke-core metal, and the raised portion extending in the lengthwise direction of the spoke-core metal and protruding therefrom towards the driver.

According to the configuration as above, as spoke deformation regions of spoke-core metals are reinforced under normal circumstances by raised portions, a decrease in rigidity of the wheel is prevented, and the resonance frequency of the steering wheel can easily be adjusted. In the event where a shock is delivered from the direction of the driver to the rim portion or its vicinity, tensile force is applied to the raised portions. The tensile force breaks or bends the raised portions or the end portions of the raised portions, thereby permitting the spoke-core metals to bend and absorb the shock.

A steering wheel as claimed in claim 2 of the present invention comprises a rim portion having a rim-core metal; a boss portion having a boss-core metal; and spoke portions having spoke-core metals for connecting together the rim-core metal and the boss-core metal, wherein each spoke portion has a core metal body and a reinforced portion enveloping the core metal body, and is provided with a spoke deformation region and a raised portion formed on the spoke deformation region, the spoke deformation region being weaker than the remaining part of the spoke-core metal, and the raised portion extending in the lengthwise direction of the spoke-core metal and protruding therefrom towards the driver.

According to the configuration as above, as the core metal body of each spoke-core metal is reinforced by the reinforced portion which envelopes the core metal body, decrease in rigidity of the wheel is limited, and the resonance frequency of the steering wheel can easily be adjusted. In the event where a shock is delivered from the direction of the driver to the rim portion or its vicinity, tensile force is applied to the raised portions. The tensile force breaks or bends the raised portions or the end portions of the raised portions, thereby permitting the spoke-core metals to bend and absorb the shock.

A steering wheel of the present invention further comprises a steering wheel, wherein each raised portion is formed as an integral body with a reinforced portion by means of casting.

According to the configuration as above, the raised portions can easily be formed as an integral body with the respective reinforced portions by means of casting. In cases where die-cast metal containing aluminum, magnesium or a similar metal, which is less resistance to tensile force than a compressive force, the raised portions are easily broken when a shock is delivered from the direction of the driver to the rim portion or its vicinity. As a result, the spoke-core metals bend due to the spoke deformation regions and absorb the shock effectively.

The above, and other objects, features and advantages of the present invention will become apparent from the following description read in conjunction with the accompanying drawings in which like reference numerals designate the same element and the scope of the invention will be indicated in the claims.

DETAILED DESCRIPTION OF THE INVENTION

Figure 1:
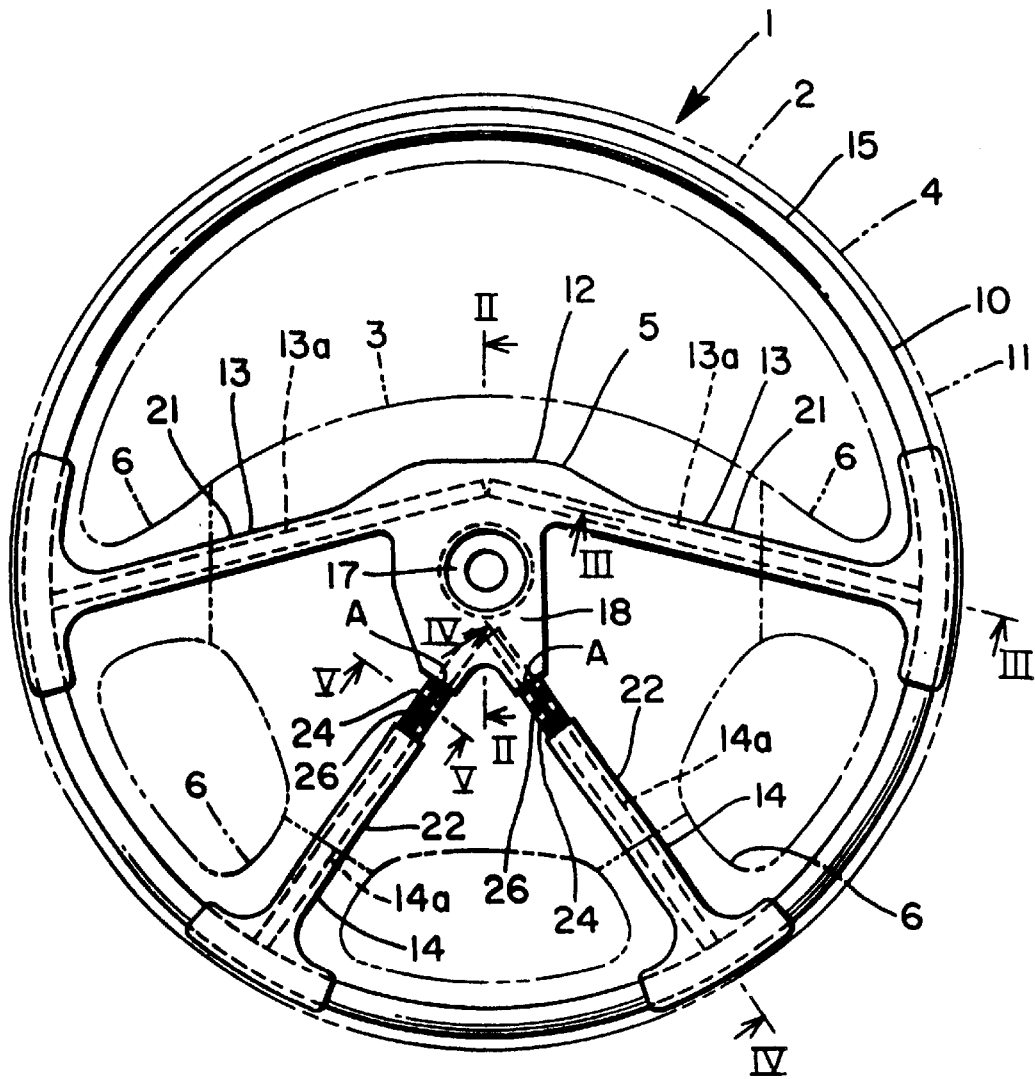
FIG. 1 is a plane of a steering wheel according to an embodiment of the present invention.

Next, the configuration of a steering wheel according to an embodiment of the invention is explained hereunder, referring to the drawings In FIG. 1, numeral 1 denotes a steering wheel of an automobile or the like, which is comprised of the body of the steering wheel (steering wheel body 2) and a pad 3 attached to steering wheel body 2. Steering wheel body 2 is comprised of an annular rim portion 4, a boss portion 5 located inside the ring defined by rim portion 4, and a plurality of spoke portions 6 connecting rim portion 4 and boss portion 5 together. Pad 3 is principally comprised of a cover and a shock absorber, such as an air bag apparatus provided underneath the cover. The cover covers a part of spoke portions 6 and the upper side of boss portion 5, in other words the side facing the driver. The underside of boss portion 5, i.e. the side facing the body of a vehicle, is covered by a lower cover which is not shown in the drawings. Steering wheel 1 is configured such that the plane defined by its rim portion 4 is inclined from the upper front end (the end closest to the windshield) towards the lower rear end (the end facing the driver) in the state where steering wheel 1 is attached to an automobile correctly.

As shown in FIGS. 1 to 5, steering wheel body 2 is mainly comprised of a core metal 10 and a cover portion (the outermost layer) 11 covering core metal 10 except for the part covered by pad 3. Cover portion 11 is made of a soft synthetic resin, such as urethane foam.

Figure 2:
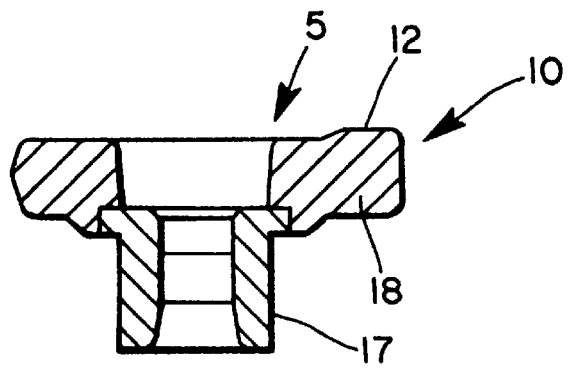
FIG. 2 is a sectional view of same taken along the line II—II of FIG. 1.

Core metal 10 is comprised of core metals connected to one another: a boss-core metal 12 located at boss portion 5, a total of four spoke-core metals 13,14 at spoke portions 6, and a rim-core metal 15 at rim portion 4. As shown in FIGS. 1 and 2, boss-core metal 12 consists of an essentially cylindrical steel boss 17 attached to a steering shaft (not shown), and a hub-core central area 18 which is integrally affixed to the upper portion of boss 17 with a die-cast metal by means of envelope casting. The die-cast metal for this purpose may be an aluminum alloy, magnesium alloy or the like. Further, the boss and the hub-core central area may be formed as an integral body at once or by following other procedures; for example, they may be formed by affixing a flat boss plate to the boss and enveloping the boss plate with a die-cast metal.

Figure 3:
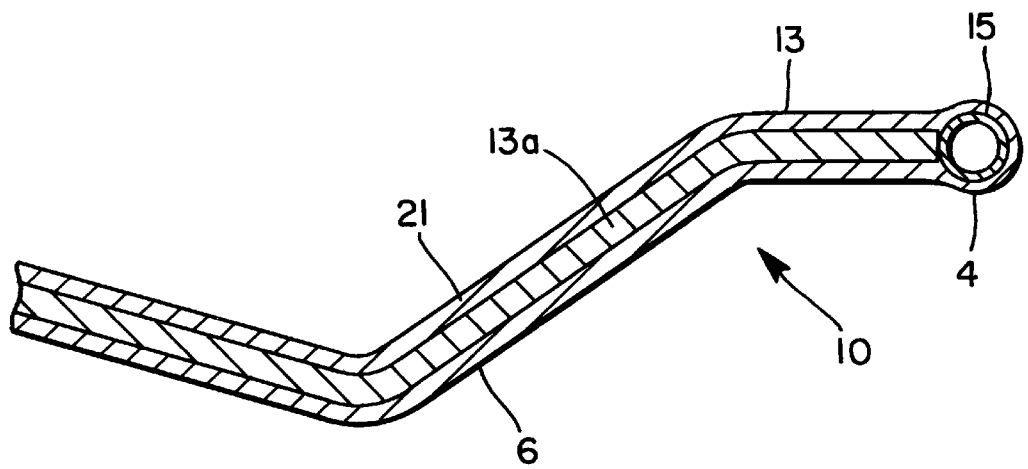
FIG. 3 is a sectional view of same taken along the line III—III of FIG. 1.
Figure 4:
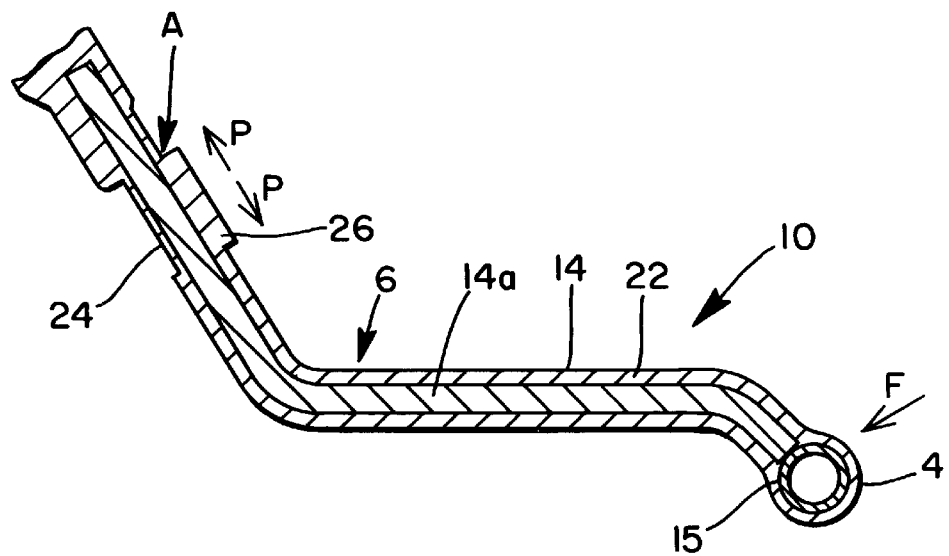
FIG. 4 is a sectional view of same taken along the line IV—IV of FIG. 1.

As shown in FIGS. 1, 3 and 4, spoke-core metals 13,14 have core metal bodies (insert spokes) 13$a$,14$a$, which are solid steel bars bent into a specified shape and enveloped by casting in reinforced portions 21,22. Reinforced portions 21,22 are integrally formed with the die-cast metal which constitutes hub-core central area 18. Rim-core metal 15 is formed from a steel pipe (a cylindrical metal pipe) which is bent into a shape of a hollow ring, with the abutted two ends welded together. Core metals 12,13,14,15 are integrally connected together, with the die-cast metal which envelopes an end of each spoke-core metal 13,14 by means of envelope casting integrally connected to hub-core central area 18 and the die-cast metal which envelopes the other end of each spoke-core metal by means of envelope casting integrally enveloping a part of rim-core metal 15. Core metals 12,13, 14,15 may be connected together by welding and then by means of envelope casting.

Figure 5:
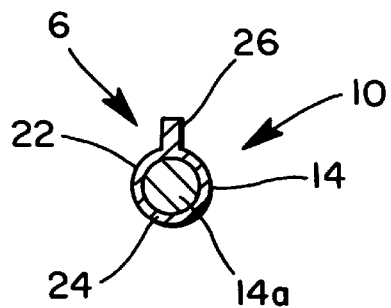
FIG. 5 is a sectional view of same taken along the line V—V of FIG. 1.

As shown in FIGS. 1, 4 and 5, each one of the pair of rear spoke-core metals 14, i.e. those closer to the driver, is provided with a spoke deformation region 24 where the diameter of reinforced portion 22 is reduced, in other words where the die-cast metal is thinner. Each spoke deformation region 24 is located closer to boss-core metal 12 than rim portion 4. In case of the present invention, each spoke deformation region 24 extends from the end adjacent to boss-core metal 12 to the surface on which the lower cover (not shown) is attached. Furthermore, a rib-like raised portion 26 extending in the axial direction of spoke-core metal 14 and protruding upward, i. e. towards the driver, is formed along the entire length of each spoke deformation region 24. As shown in FIG. 4, each raised portion 26 is higher than reinforced portion 22 where spoke deformation region 24 is not formed so that raised portion 26 protrudes outward from the outer surface of reinforced portion 22, thereby forming a corner A at the end adjacent to boss portion 5.

In the configuration of a steering wheel 1 according to the embodiment of the invention described above, respective spoke-core metals 13,14 are not only enveloped in reinforced portions 22, which are formed of die-cast metal by means of envelope casting along the entire length of core metals 13,14, but also connected to boss-core metal 12 and rim-core metal 15 as an integral body with them. With the configuration as above, the embodiment of the invention is capable of increasing the strength (the rigidity) of steering wheel body 2 and easily increasing the resonance frequency of steering wheel 1 to a desired level. In other words, by limiting uncomfortable resonance of steering wheel 1, which is caused by vibration transmitted through the steering shaft, the invention is capable of making operation of steering wheel 1 more comfortable. Spoke-core metals 14 of spoke portions 6 which are situated in front of the driver have spoke deformation regions 24 where reinforced portions 22 are thinner. However, each spoke deformation region 24 is reinforced by a rib-like raised portion 26 formed thereon so that the strength of the steering wheel is increased, resulting in the increased resonance frequency. As each raised portion 26 protrudes in the direction opposite the direction in which steering wheel 1 vibrates, i.e. the direction represented by an arrow F in FIG. 4, it is possible to increase the section modulus of the steering wheel, thereby increasing its rigidity. As a result, the resonance frequency is effectively increased to a high level.

Spoke-core metals 14 of spoke portions 6 which are situated in front of the driver have spoke deformation regions 24 where reinforced portions 22 are thinner. Therefore, in the event of a collision or a similar accident, where the driver collides with the lower rear part of rim portion 4 of steering wheel 1, load is applied in the direction represented by arrow F in FIG. 4, elastically bending the part of core metal bodies 14$a$ of spoke-core metals 14 where respective spoke deformation regions 24 are located. Thus, the shock of the collision is effectively absorbed.

A raised portion 26 is formed on each spoke deformation region 24 in order to increase its strength. However, raised portions 26 are formed on the side of spoke-core metals 14 facing the operator, in other words they protrude in the direction opposite the direction represented by arrow F, in which load is applied in the event of a collision. Therefore, when load is applied in the direction represented by arrow F, tensile force is applied to each raised portion 26 in the directions represented by arrows P in FIG. 4. As this tensile force breaks raised portions 26 and permits spoke-core metals 14 to bend at their spoke deformation regions 24, the shock of the collision is effectively absorbed.

Each raised portion 26 is so formed as to extend in the axial direction of spoke-core metal 14, more precisely along the entire length of spoke deformation region 24, and protrude above reinforced portion 22. Therefore, when tensile force resulting from load applied in the direction represented by arrow F is applied to each raised portion 26 in the directions represented by arrows P in FIG. 4, the stress is concentrated in corner A of raised portion 26, thereby ensuring reinforced portion 22 to break precisely at the position where corner A is located. By thus specifying the locations at which core metal 10 is deformed, the invention is capable of stabilizing shock absorbing characteristics of steering wheel 1.

In cases where an aluminum alloy is used as the die-cast metal to form raised portions 26, it is easier for a shock applied from the driver's side to break raised portions 26, thereby permitting spoke-core metals 14 to bend, because aluminum has a lower tensile than compression strength.

Therefore, compared with cases where soft steel or the like is used, the shock is more effectively absorbed.

Furthermore, as spoke deformation regions 24 and raised portions 26 can easily be formed as an integral body with respective reinforced portions 22 by means of die-casting without increasing the number of parts, the invention is capable of simplifying the structure of a steering wheel and consequently reducing production costs.

According to the embodiment described above, each spoke deformation region 24 is formed by providing a thinner part of each reinforced portion 22. However, a spoke deformation region may be formed in other ways; for example by providing an opening where metal core body 14a is exposed or combining a thinner portion with an opening.

Because of the configuration wherein spoke deformation regions of spoke-core metals are reinforced under normal circumstances by raised portions, a steering wheel according to claim 1 of the present invention is capable of restricting a decrease in rigidity of the wheel and therefore the resonance frequency of the steering wheel is easily adjustable.

As vibration of the wheel is thus limited, operation of the steering wheel is made more comfortable. In the event where a shock is delivered from the direction of the driver to the rim portion or its vicinity, tensile force is applied to the raised portions. The tensile force breaks or bends the raised portions or the end portions of the raised portions, thereby permitting the spoke-core metals to bend and absorbing the shock.

Because of the configuration wherein the body of each spoke-core metal is reinforced by a reinforced portion which envelopes the core metal body, a steering wheel according to the present invention is capable of preventing decrease in rigidity of the steering wheel. Therefore, the configuration makes the resonance frequency of the steering wheel easily adjustable, thereby limiting vibration of the steering wheel. As a result, operation of the steering wheel is made more comfortable. In the event where a shock is delivered from the direction of the driver to the rim portion or its vicinity, tensile force is applied to the raised portions. The tensile force breaks the end portions of the raised portions, thereby permitting the spoke-core metals to bend due to their spoke deformation regions. Thus, the shock is absorbed.

While having the same effect as that of a steering wheel described as a preferred embodiment of this invention, a steering wheel, in another embodiment of the invention is capable of reducing production costs of a steering wheel by providing a simplified structure wherein each raised portion is formed as an integral body with a reinforced portion by means of casting. In cases where die-cast metal containing aluminum, magnesium or a similar metal which is less resistance to a tensile force that a compressive force, the raised portions are easily broken when a shock is delivered from the direction of the driver to the rim portion or its vicinity. As a result, the spoke-core metals bend due to the spoke deformation regions and effectively absorb the shock.

What is claimed is:

1. A steering wheel comprising a rim portion having a rim-core metal; a boss portion having a boss-core metal; and a plurality of spoke portions having spoke-core metal, wherein:

each of said spoke portions is provided with a spoke deformation region adjacent the boss portion and a rib-like raised portion formed on said spoke deformation region, the rib-like raised portion formed along an entire length of the spoke deformation region, said spoke deformation region having a smaller cross-sectional area than the remaining spoke portion and thereby being weaker than the remaining part of the spoke-core metal, and said rib-like raised portion further extending in the lengthwise direction of the spoke-core metal and protruding therefrom radially upward opposite the spoke deformation region towards the position of a driver who would operate the steering wheel, whereby on impact by the driver on the steering wheel, stress is concentrated in the spoke deformation region breaking the spoke deformation region at a corner formed by the rib-like raised portion and spoke portion juxtaposed to the boss portion, thereby deforming the spoke-core metal in the spoke deformation region.

2. A steering wheel comprising a rim portion having a rim-core metal; a boss portion having a boss-core metal; and a plurality of spoke portions having spoke-core metals for connecting together said rim-core metal and said boss-core metal, wherein:

each of said spoke portions has a core metal body and a reinforced portion enveloping said core metal body, and is provided with a spoke deformation region adjacent the boss portion and a rib-like raised portion formed on said spoke deformation region, the rib-like raised portion formed along an entire length of the spoke deformation region, said spoke deformation region having a smaller cross-sectional area than the remaining spoke portion and thereby being weaker than the remaining part of the spoke-core metal, and said rib-like raised portion further extending in the lengthwise direction of the spoke-core metal and protruding therefrom radially upward opposite the spoke deformation region towards the position of a driver who would operate the steering wheel, whereby on impact by the driver on the steering wheel, stress is concentrated in the spoke deformation region breaking the spoke deformation region at a corner formed by the rib-like raised portion and spoke portion juxtaposed to the boss portion, thereby deforming the spoke-core metal in the spoke deformation region.

3. A steering wheel as claimed in claim 2 wherein each rib-like raised portion is formed as an integral body with said reinforced portion by means of casting.

4. A steering wheel as claimed in claim 3, wherein the spoke-core metal is made of steel and the reinforced portion enveloping the core metal body, including the rib-like raised portion, is made of an aluminum alloy or a magnesium alloy.

5. A steering wheel comprising a rim portion having a rim-core metal; a boss portion having a boss-core metal; and a plurality of spoke portions having spoke-core metal, wherein:

each of the spoke portions located in a lower half of the steering wheel is provided with a spoke deformation region adjacent the boss portion and a rib-like raised portion formed on said spoke deformation region, the rib-like raised portion formed along an entire length of the spoke deformation region, said spoke deformation region having a smaller cross-sectional area than the remaining spoke portion and thereby being weaker than the remaining part of the spoke-core metal, and said rib-like raised portion further extending in the lengthwise direction of the spoke-core metal and protruding therefrom radially upward opposite the spoke deformation region towards the position of a driver who would operate the steering wheel, whereby on impact by the driver on the steering wheel, stress is concentrated in the spoke deformation region breaking the spoke deformation region at a corner formed by the rib-like raised portion and spoke portion juxtaposed to the boss portion, thereby deforming the spoke-core metal in the spoke deformation region.

6. A steering wheel comprising a rim portion having a rim-core metal; a boss portion having a boss-core metal; and a plurality of spoke portions having spoke-core metals for connecting together said rim-core metal and said boss-core metal, wherein:

each of said spoke portions has a core metal body and a reinforced portion enveloping said core metal body, and each of said spoke portions located in a lower half of the steering wheel is provided with a spoke deformation region adjacent the boss portion and a rib-like raised portion formed on said spoke deformation region, the rib-like raised portion formed along an entire length of the spoke deformation region, said spoke deformation region having a smaller cross-sectional area than the remaining spoke portion and thereby being weaker than the remaining part of the spoke-core metal, and said rib-like raised portion further extending in the lengthwise direction of the spoke-core metal and protruding therefrom radially upward opposite the spoke deformation region towards the position of a driver who would operate the steering wheel, whereby on impact by the driver on the steering wheel, stress is concentrated in the spoke deformation region breaking the spoke deformation region at a corner formed by the rib-like raised portion and spoke portion juxtaposed to the boss portion, thereby deforming the spoke-core metal in the spoke deformation region.

7. A steering wheel as claimed in claim 6 wherein each rib-like raised portion is formed as an integral body with said reinforced portion by means of casting.

* * * * *